United States Patent [19]

Alusick et al.

[11] Patent Number: 5,056,231
[45] Date of Patent: Oct. 15, 1991

[54] APPARATUS FOR LOCKING WHEEL UNIT IN AUTOMOTIVE WHEEL ALIGNMENT SYSTEM

[75] Inventors: Michael P. Alusick, Hartland; John M. Surwillo, Milwaukee, both of Wis.

[73] Assignee: Bear Automotive Service Equipment Co., Milwaukee, Wis.

[21] Appl. No.: 531,919

[22] Filed: Jun. 1, 1990

[51] Int. Cl.⁵ .................... G01B 5/255; G01B 11/275
[52] U.S. Cl. ................................. 33/203.18; 33/203.19
[58] Field of Search ............ 33/203.15, 203.16, 203.17, 33/203.18, 203.19, 203.20, 600, 288; 403/362; 279/83, 76, 79

[56] References Cited

U.S. PATENT DOCUMENTS

| | | | |
|---|---|---|---|
| 3,698,748 | 10/1972 | Petri | 279/76 |
| 4,285,136 | 8/1981 | Ragan | 33/203.18 |
| 4,408,399 | 10/1983 | Darwood et al. | 33/203.18 |
| 4,432,145 | 2/1984 | Caroff | 33/203.18 |
| 4,466,196 | 8/1984 | Woodruff | 33/203.18 |
| 4,569,140 | 2/1986 | Hobson | 33/288 |
| 4,574,489 | 3/1986 | Grossart | 33/203.18 |
| 4,594,789 | 6/1986 | Marino et al. | 33/288 |
| 4,629,317 | 12/1986 | January et al. | 33/203.18 |
| 4,753,273 | 3/1988 | Eck | 33/288 |
| 4,803,785 | 2/1989 | Reilly | 33/203.18 |
| 4,815,216 | 3/1989 | Swayne | 33/203.18 |

OTHER PUBLICATIONS

"Wheelforce", Wheel Alignment Model 1900 DL Operating Instructions, VL Churchill Ltd., 3/1986.

Primary Examiner—William A. Cuchlinski, Jr.
Assistant Examiner—Alvin Wirthlin
Attorney, Agent, or Firm—Kinney & Lange

[57] ABSTRACT

In an automotive vehicle wheel alignment system, a rim clamp is attached onto the rim of a wheel and a head unit is connected to the rim clamp. The rim clamp includes a spindle having circumferential grooves. The head unit includes a spindle-receiving sleeve with a spring loaded plunger and a set screw adapted for being received by the grooves in the spindle. The set screw tightens the head unit on the spindle of the rim clamp. The spring loaded plunger and groove allow the head unit to rotate with respect to the wheel without loss of registration in the axial direction between the head unit and the wheel.

5 Claims, 3 Drawing Sheets

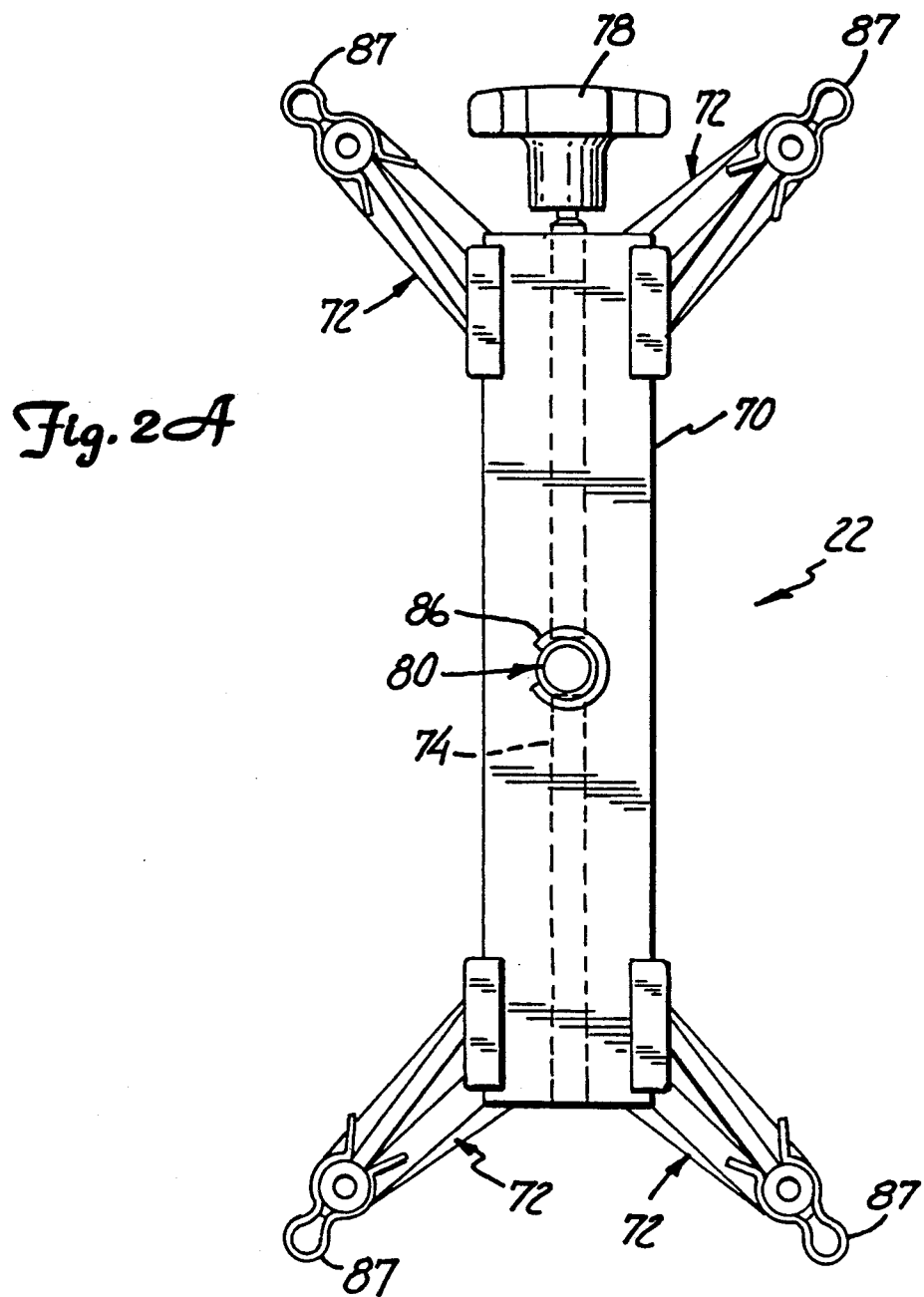

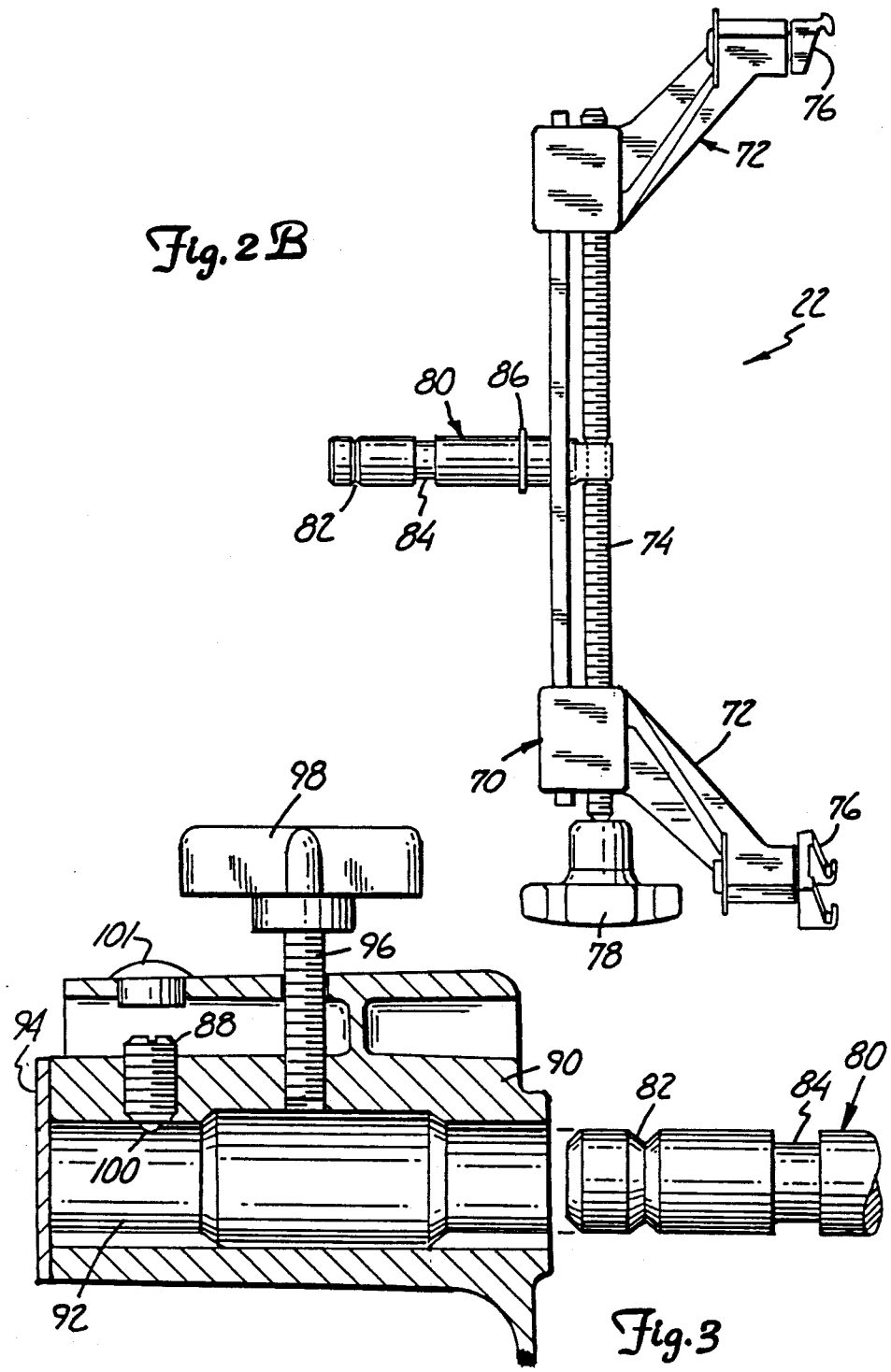

1

APPARATUS FOR LOCKING WHEEL UNIT IN AUTOMOTIVE WHEEL ALIGNMENT SYSTEM

BACKGROUND OF THE INVENTION

The present invention relates to automobile wheel alignment systems. In particular, the invention relates to a method and apparatus for mounting wheel alignment test equipment on a wheel of an automobile.

Proper alignment of wheels in an automotive vehicle is important for proper handling of the vehicle and proper tire wear. In addition, the proper alignment of the wheels will decrease fuel consumption as well as increase vehicle safety. The wheel alignment parameters which are measured and adjusted in order to achieve proper wheel alignment are camber, caster, steering axis inclination and toe.

Accurate measurement of these parameters is only possible if the test equipment is accurately and securely coupled to the wheels of the vehicle under test. Minor inaccuracies in the connection of the test equipment to the automobile wheels can give rise to errors in the alignment measurements. For accurate alignment, the axial registration between test equipment and the wheels must be maintained.

In measuring wheel alignment, measuring devices ("head units") are clamped onto the four wheels of the vehicle under test. On each side of the vehicle, head units measure the front to back and back to front angles between each pair of wheels. The head units also measure the side angles between the front or back pair of left and right wheels. U.S. Pat. No. 4,594,789 issued June 17, 1986 to Marino et al entitled "Wheel Alignment System" is incorporated by reference. The Marino patent shows a wheel alignment system using head units to measure wheel alignment angles. The head units are mounted to the wheels with a clamping apparatus called a "rim clamp." Typically, a rim clamp clamps to a rim of a wheel. The rim clamp provides a spindle generally co-axial with an axis of the wheel. The spindle is inserted into a spindle clamp on the head unit. The spindle clamp includes a set screw which can be tightened against the spindle to secure the head unit on the rim clamp.

During alignment measurements for the vehicle under test, the wheel must be rotated. For example, when an operator performs run-out compensation. To rotate a wheel, the set screw which secures the head unit to the rim clamp must be loosened. The wheel is then rotated while the head unit remains generally stationary relative to the other head units and the body of the car. However, during this procedure, the head unit can slide along the axis of the spindle so that the registration in the axial direction between the head and unit rim clamp is lost. Loss of registration introduces an additional angle into the alignment measurements which causes an error.

It would be highly desirable to provide a mount for a wheel unit in a automotive vehicle wheel alignment system which allows the wheel to be rotated without loss for registration in the axial direction between the head unit and the wheel.

SUMMARY OF THE INVENTION

The present invention provides a mount for a head unit in an automotive vehicle wheel alignment system which can be partially de-coupled from the wheel to allow the wheel to rotate without loss of registration between the head unit and the wheel.

In the present invention, the head unit mounts to a rim clamp. The rim clamp couples to the rim of an automotive wheel and provides a spindle on which the head unit is supported. The spindle includes a groove which is cut around the circumference of the spindle.

The head unit carries angle sensors and is mounted to the rim clamp at the spindle of the rim clamp. The head unit includes a receptacle for the spindle. A spring loaded plunger is adapted for fitting into the groove of the spindle. A set screw can be tightened to secure the head unit on the rim clamp.

To mount the head unit on a wheel, the rim clamp is clamped onto the wheel. The head unit is inserted onto the spindle of the rim clamp. The spindle pushes on the spring loaded plunger as the spindle is inserted into the head unit. When the spindle is inserted far enough into the head unit, the spring loaded plunger snaps into the groove of the spindle. This secures the head unit to the rim clamp. The set screw can be tightened to prevent the head unit from rotating with respect to the wheel unit.

To rotate the head unit with respect to the wheel unit (for example, to perform run-out compensation), the set screw can be loosened which allows the wheel unit to rotate. The spring loaded plunger clamps the spindle of the rim clamp so that registration in the axial direction between the head unit and the rim clamp is not lost. After the head unit has been rotated into the correct position, the set screw can be re-tightened to secure the head unit to the rim clamp.

BRIEF DESCRIPTION OF THE DRAWINGS

FIGS. 2A and 2B are front and side views of a rim clamp.

FIG. 3 is a sectional view of a head unit and a rim clamp made in accordance with the present invention.

DETAILED DESCRIPTION OF THE PREFERRED EMBODIMENTS

Figure 1:
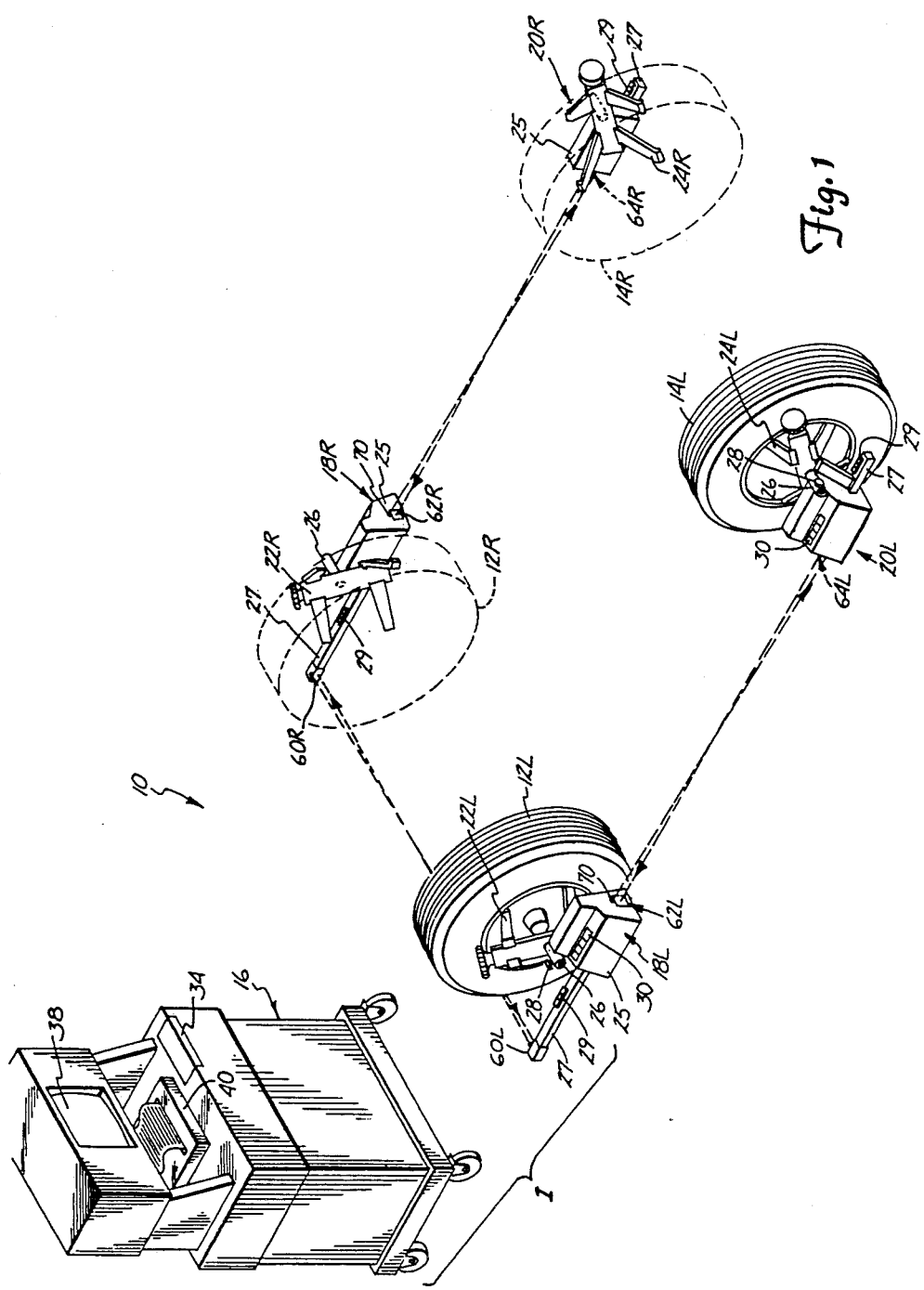
FIG. 1 is perspective view of an automotive vehicle wheel alignment system in accordance with the present invention.

FIG. 1 shows a wheel alignment system 10 of the general type known in the art in which the improvement of the present invention is implemented.

In FIG. 1, wheel alignment system 10 is used to measure the alignment of left front wheel 12L, right front wheel 12R (shown in phantom), left rear wheel 14L and right rear wheel 14R (shown in phantom) of an automotive vehicle. For clarity, the remaining portions of the vehicle are not shown. System 10 includes a main console 16, left and right front head units 18L and 18R, and left and right rear head units 20L and 20R. Head units 18L, 18R, 20L and 20R are connected to main console 16 by multiconductor electrical signal transmission cables (not shown).

Head units 18L, 18R, 20L and 20R are supported on wheels 12L, 12R, 14L and 14R by rim clamps 22L, 22R, 24L and 24R, respectively. Rim clamps 22L, 22R, 24L and 24R are self-centering, four-leg rim clamps which fit a wide range of different wheel sizes without the need for special adapters. Each head unit (18L, 18R, 20L, 20R) includes a housing 25, a sleeve 26 and an arm 27. Sleeve 26 mounts over a spindle of the corresponding rim clamp. Each head unit (18L, 18R, 20L, 20R) is locked into position on the spindle of the corresponding rim clamp (22L, 22R, 24L, 24R) by spindle clamp 28. A bubble level 29 mounted on arm 27 provides a visual indication to the mechanic that the head unit (18L, 18R, 20L, 20R) is level horizontally before spindle clamp 28 is clamped. A set of switches 30 on housing 25 allows the mechanic to signal main console 16 that a measurement is made and to respond to messages displayed by main console 16.

As shown in FIG. 1, main console 16 includes a computer (not shown) having a keyboard 34 as an input device and CRT display 38 and printer 40 as output devices. A power supply (not shown) which is located within main console 16, supplies power to the computer and its input and output devices, and also supplies power to head units 18L, 18R, 20L, 20R.

The computer (not shown) supplies data and instructions to the head units 18L, 18R, 20L and 20R and receives wheel alignment measurement values from each of the head units. Based upon these measurement values, the computer provides wheel alignment output values and other information to the mechanic through CRT display 38 and printer 40.

In wheel alignment system 10 shown in FIG. 1, there are a total of six angle sensor units used to measure toe angles. Front left head unit 18L carries a left-to-right angle sensor 60L and a front-to rear angle sensor 62L. Front right head unit 18R carries a right-to-left angle sensor 60R and a front-to-rear angle sensor 62R. Left rear head unit 20L bears a rear-to-front angle sensor 64L, and right rear head unit 20R carries a rear-to-front angle sensor 64R.

The angle sensor units are arranged to operate in pairs. Angle sensors 60L and 60R are mounted at the front ends of arms 27 of front head units 18L and 18R and face one another. Angle sensor 62L is mounted at the rear end of housing 25 of head unit 18L and faces angle sensor 64L which is mounted at the front end of head unit 20L. Similarly, angle sensor 62R of head unit 18R faces angle sensor 64R of head unit 20R.

All six angle sensors 60L, 60R, 62L, 62R, 64L and 64R contain a photodetector array, an aperture and a target (not shown). The lens and photodetector array of one of the angle sensors receives light from the target of the other angle sensor which it faces. In other words, angle sensor 60L receives light from the target of angle sensor 60R, and vice versa. Angle sensor 62L receives light from the target of angle sensor 64L, and vice versa. Angle sensor 62R receives light from target of angle sensor 64R, and vice versa.

The accuracy of the alignment measurements is dependent upon the accuracy of the axial registration between each head unit and its respective wheel. Errors introduced in the measurement due to misalignment of a rim clamp with a wheel are compensated using run-out compensation. To perform run-out compensation, an operator connects the head unit to the wheels of the automobile under test and a first set of angle readings are taken. A head unit is de-coupled by loosening a set screw from the rim clamp and the wheel is rotated. The set screw is then tightened so that the head unit is reconnected to the rim clamp, and then additional measurements are taken. These steps are used to cancel out any errors in the angle measurements introduced due to misalignment between the axis of the rim clamp and the axis of the wheel. However, the operation of de-coupling the head unit, rotating the wheel and re-coupling the head unit can alter the registration in the axial direction between the head unit and the wheel, and thereby introduce errors into the alignment measurements.

FIGS. 2A and 2B are front and side views, respectively, of a rim clamp 22 made in accordance with the present invention which reduces errors in alignment measurements. Rim clamp 22 includes slidebar 70 and wheel clamp arms 72. A threaded wheel clamp arm adjusting shaft 74 extends through slidebar 70. Wheel clamp arms 72 carry rim hooks 76. A handle 78 connects to threaded wheel clamp arm adjusting shaft 74. A spindle 80 connects to slidebar 70 and couples to threaded wheel clamp arm adjusting shaft 74. Spindle 80 includes grooves 82 and 84 and E-ring (or abutting ring) 86. Clip hairpins 87 secure rim hooks 76 to wheel clamp arms 72.

Rim hooks 76 are adapted for coupling to the rim of a wheel in an automotive vehicle. If handle 78 is turned in a first direction, threaded wheel clamp arm adjusting shaft 74 spreads apart arms 72. If handle 78 is turned in a second, opposite direction, wheel clamp arms 72 are pulled together so that rim hooks 76 can grasp the rim of a wheel. Spindle 80 is mounted to slidebar 70 of rim clamp 22 so that spindle 80 extends substantially parallel to and aligned with the axis of rotation for the wheel.

FIG. 3 is a sectional view of spindle clamp 28 shown in FIG. 1 and is an integral portion of the body of head unit 18. Spindle clamp 28 includes spring plunger 88 in housing 90. Housing 90 includes a spindle receiving cavity 92 and an end cap 94. A set screw 96 connects to a handle 98 and is received through housing 90. Spring plunger 88 is spring loaded and includes an abutting tip 100. A plunger cap 101 is received in housing 90 and covers spring loaded plunger 88.

To clamp a head unit 18 onto a rim clamp 22, spindle clamp 28 is mounted onto spindle 80 and spindle 80 is received into spindle receiving cavity 92. Spindle 80 abuts an abutting tip 100 of spring plunger 88 which forces abutting tip 100 into spring plunger 88. When spindle 80 is inserted far enough into spindle receiving cavity 92, spring plunger 88 forces abutting tip 100 into groove 82 of spindle 80. This is a snap-on type fit. When abutting tip 100 of spring plunger 88 has snapped into place in groove 82 of spindle 80, set screw 96 can be screwed down with handle 98 into groove 84. The action of spring plunger 88 forces E-ring 86 against housing 90. Spring plunger 88 and E-ring 86 provide positive retaining force in opposing directions to hold head unit 18 on rim clamp 22.

To rotate a head unit 18, set screw 96 is loosened by turning handle 98. This allows head unit 18 to rotate. Spring plunger 88 and abutting tip 100 grasp spindle 80 at groove 82 so that registration in the axial direction is not lost between head unit 18 and rim clamp 22. When head unit 18 has been rotated to the desired position, set screw 96 is tightened against spindle 80 to secure head unit 18. The combination of spring plunger 88 and abutting tip 100 with groove 82 of spindle 80 secures head unit 18 to rim clamp 22 while still allowing head unit 18 to rotate.

The present invention provides a means of securing a head unit to a wheel of an automotive vehicle during wheel alignment testing. The invention reduces errors introduced into alignment measurements by loss of registration between a head unit and the other head units and chassis of the automotive vehicle which unit slides on spindle of a rim clamp. A spring plunger in the head unit and a groove in the spindle which connects to the wheel, interact to couple the head unit to the wheel but still allow the head unit to rotate.

Although the present invention has been described with reference to preferred embodiments, workers skilled in the art will recognize that changes may be made in form and detail without departing from the spirit and scope of the invention. For example, the groove in the spindle and the abutting tip can be any suitable shape and the spring can comprise any means for urging the abutting tip into the groove.

What is claimed is:

1. An automotive vehicle wheel alignment apparatus comprising:
    a main console for receiving wheel angle information coupled to wheels of an automotive vehicle from a plurality of angle sensors and providing an output representative of wheel alignment;
    a rim clamp for clamping to a rim of a wheel of the automotive vehicle, the rim clamp including a spindle which lies generally coaxial with an axis of rotation of the wheel, wherein the spindle includes a first groove which has generally sloping sides defining a generally V shape and a second groove which has generally straight sides defining generally squared groove edges;
    a head unit which includes at least one of the plurality of angle sensors and a housing, wherein the housing defines a spindle receiving cavity shaped to receive the spindle;
    a set screw threadably received through the housing and into the spindle receiving cavity, the set screw including a tip portion for being received in the second groove, the set screw movable between a disengaged position in which the tip portion is disengaged from the second groove and an engaged position in which the tip portion is engaged with the second groove wherein the head unit is fixedly attached against rotation to the spindle when the set screw is in the engaged position; and
    a spring plunger received in the housing, the spring plunger including an abutting tip which extends into the spindle receiving cavity and is urged in a direction into the spindle receiving cavity, the abutting tip is positioned for being received into the first groove of the spindle wherein the abutting tip rides along sides of the spindle and the generally sloping sides of the first groove as the head unit is moved longitudinally relative to the spindle and the abutting tip engages the first groove, wherein when the first groove of the spindle is engaged by the abutting tip, the head unit is secured longitudinally relative to the spindle and the head unit is rotatable relative to the spindle.

2. The apparatus of claim 1 including an abutting ring on the spindle which abuts the head unit when the head unit is moved longitudinally relative to the spindle.

3. The apparatus of claim 1 including an end cap on one end of the spindle receiving cavity.

4. The apparatus of claim 1 wherein the spring plunger is threadably received in the housing.

5. The apparatus of claim 4 including a plunger cap received in the housing which covers an exposed portion of the spring plunger.

* * * * *